(12) United States Patent
Yanagihara et al.

(10) Patent No.: US 11,740,491 B2
(45) Date of Patent: Aug. 29, 2023

(54) OPTICAL MODULE AND MANUFACTURING METHOD THEREOF

(71) Applicant: Nippon Telegraph and Telephone Corporation, Tokyo (JP)

(72) Inventors: Ai Yanagihara, Musashino (JP); Kenya Suzuki, Musashino (JP); Takashi Go, Musashino (JP); Keita Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/623,507

(22) PCT Filed: Jul. 5, 2019

(86) PCT No.: PCT/JP2019/026782
§ 371 (c)(1),
(2) Date: Dec. 28, 2021

(87) PCT Pub. No.: WO2021/005635
PCT Pub. Date: Jan. 14, 2021

(65) Prior Publication Data
US 2022/0357601 A1 Nov. 10, 2022

(51) Int. Cl.
*G02F 1/01* (2006.01)
*G02B 6/35* (2006.01)
(Continued)

(52) U.S. Cl.
CPC ......... *G02F 1/0147* (2013.01); *G02B 6/3596* (2013.01); *G02F 1/136* (2013.01);
(Continued)

(58) Field of Classification Search
CPC ...... G02F 1/0147; G02F 1/136; G02F 1/3136; G02F 1/01; G02F 1/313; G02B 6/3596;
(Continued)

(56) References Cited

U.S. PATENT DOCUMENTS

| 7,228,019 | B2* | 6/2007 | Takahashi ............ G02F 1/0147 |
| | | | 385/39 |
| 2008/0181550 | A1 | 7/2008 | Earnshaw |
| 2015/0025351 | A1 | 9/2015 | Celo |

FOREIGN PATENT DOCUMENTS

| JP | 2003-84252 A | 3/2003 |
| JP | 2007-25583 A | 2/2007 |

(Continued)

OTHER PUBLICATIONS

Toshio Watanabe et al., *Silica-based PLC Transponder Aggregators for Colorless, Directionless, and Contentionless ROADM*, OFC/NFOEC Technical Digest 2012 OSA, pp. 10-13.
(Continued)

*Primary Examiner* — John Bedtelyon
(74) *Attorney, Agent, or Firm* — Workman Nydegger

(57) ABSTRACT

An optical switch is configured by providing a planar lightwave circuit layer on a top surface of a Si substrate. The circuit layer forms, on the top surface of the substrate, an optical waveguide including an underclad layer, an optical waveguide core, and an overclad layer. The optical waveguide is provided to have a structure configuring a Mach-Zehnder interferometer. A heater is provided at a position just above an arm of the core on the top surface of the clad layer, and power supply electric wires are electrically connected to both ends of the heater. In a local portion including an interface between the clad layer and the top surface of the substrate, trench structure portions as concave grooves are provided.

6 Claims, 11 Drawing Sheets

(51) Int. Cl.
  *G02F 1/136* (2006.01)
  *G02F 1/313* (2006.01)
  *G02B 6/12* (2006.01)

(52) U.S. Cl.
  CPC .. *G02F 1/3136* (2013.01); *G02B 2006/12145* (2013.01); *G02B 2006/12159* (2013.01)

(58) Field of Classification Search
  CPC .......... G02B 2006/12145; G02B 2006/12159; G02B 6/12
  See application file for complete search history.

(56) References Cited

FOREIGN PATENT DOCUMENTS

| | | |
|---|---|---|
| JP | 2010-517113 | 5/2010 |
| JP | 2017-500601 A | 1/2017 |

OTHER PUBLICATIONS

T. Shibata et al., *Silica-Based Waveguide-Type 16 16 Optical Switch Module Incorporating Driving Circuits*, IEEE Photonics Technology Letters, vol. 15, No. 9, Sep. 2003, pp. 1300-1302.

Kei Watanabe et al., *Ultralow Power Consumption Silica-Based PLC-VOA/Switches*, Journal of Lightwave Technology, vol. 26, No. 14, Jul. 15, 2008, pp. 2235-2244.

R. Kasahara et al., *Low-Power Consumption Silica-Based 2 2 Thermooptic Switch Using Trenched Silicon Substrate*, IEEE Photonics Technology Letters, vol. 11, No. 9, Sep. 1999, pp. 1132-1134.

\* cited by examiner

OPTICAL MODULE AND MANUFACTURING METHOD THEREOF

TECHNICAL FIELD

The present invention relates to an optical module including a planar optical waveguide type optical device and a manufacturing method thereof.

BACKGROUND ART

To prepare for large-scale disasters, an optical fiber network connecting local stations has been improved to have multiple paths. Further, along with improvement in paths, requests for automatic change of these paths are increased.

To meet such requests, demands for a CDC-ROADM (Re-configurable Optical Add Drop. Multiplexer) system that realizes change flexibility of the paths of the optical network are increased. Note that CDC is an abbreviation of colorless, directionless, and contentionless.

The CDC-ROADM system is basically used to connect a backbone network; however, in recent years, for example, the CDC-ROADM system is used for connection between data centers, and an application range of the CDC-ROADM system is expanded. Accordingly, reduction in price and power consumption is desired.

A multicast switch is an essential component of the CDC-ROADM system. There are a multicast switch including a micromachine switch MEMS switch and a multicast switch including a planar lightwave circuit (PLC). The PLC multicast switch is low in cost and is excellent in mass productivity. As the PLC multicast switch, a multicast switch using silicon photonics and a multicast switch using a Silica-based PLC have been reported. The multicast switch using the Silica-based PLC is excellent in terms of low loss, high extinction characteristics, and high reliability.

As examples relating to such a CDC-ROADM system and a planar optical waveguide type optical device suitable for the CDC-ROADM system, for example, there are techniques disclosed in Non-Patent Literatures 1 to 4 described below.

CITATION LIST

Non-Patent Literature

Non-Patent Literature 1: Toshio Watanabe, Kenya Suzuki, Tetsuo Takahashi, "Silica-based PLC Transponder Aggregators for Colorless, Directionless, and Contentionless ROADM," OFC/NFOEC Technical Digest 2012 OSA Non-Patent Literature 2: T. Shibata, M. Okuno, T. Goh, T. Watanabe, M. Yasu, M. Itoh, M. Ishii, Y. Hibino, A. Sugita, Member, IEEE, and A. Himeno, "Silica-based Waveguide-Type 16×16 Optical Switch Module Incorporating Driving Circuits", IEEE PHOTONICS TECHNOLOGY LETTERS, VOL. 15, NO. 9 Sep. 2003

Non-Patent Literature 3: Kei Watanabe, Yasuaki Hashizume, Yusuke Nasu, Masaki Kohtoku, Mikitaka Itoh, and Yasuyuki Inoue, Member, IEEE "Ultralow Power Consumption Silica-Based PLC-VOA/Switches" JOURNAL OF LIGHTWAVE TECHNOLOGY Vol. 26, No. 14, Jul. 15, 2008 (pp. 2235-2244)

Non-Patent Literature 4: R. Kasahara, M. Yanagisawa, A. Sugita, Member, IEEE, T. Goh, M. Yasu, A. Himeno, and S. Matsui, Low-Power Consumption Silica-Based 2×2 Thermooptic Switch Using Trenched Silicon Substrate, IEEE PHOTONICS TECHNOLOGY LETTERS, VOL. 11, NO. 9, September 1999

With regard to the above-described Literatures, in particular to reduce power consumption of the CDC-ROADM system, reduction in power consumption of the above-described Silica-based PLC optical switch as a key device is important.

The Silica-based PLC optical switch includes a Mach-Zehnder interferometer (MZI) driven by a thermo-optical effect as described below. When heat is applied to at least one of two arm waveguides of the MZI, a refractive index of the arm waveguide is changed, and an interference state of light is changed. As a result, intensity of output light is changed, and ON/OFF is realized.

To operate the Silica-based PLC optical switch, it is necessary to heat the arm waveguides of the MZI by using heaters disposed near the arm waveguides. Power to heat the heaters is consumed. The Silica-based PLC typically includes optical waveguides each made of a quartz having a thickness of several 10 μm on a Si substrate having a thickness of about 1 mm. When heat is applied to the optical waveguides by the heaters, the heat is transferred to the Si substrate higher in thermal conductivity than glass. Accordingly, it is necessary to supply the power to the heaters by an amount of the diffused heat and to continuously drive the heaters. This increases the power consumption. Note that the optical switch using silicon photonics is excellent in terms of power consumption, but is inferior to the Silica-based PLC optical switch in terms of optical characteristics, reliability, stability of switch operation, and other performances.

Accordingly, as described below, some methods to embody reduction in power consumption of the Silica-based PLC optical switch have been proposed.

A first method is to form heat insulation grooves on both sides near the arms of the Mach-Zehnder interferometer. This makes it possible to form an Air layer lower in thermal conductivity than $SiO_2$, and to prevent diffusion of the heat applied to cores of the optical waveguides.

A second method is to make a thickness of an underclad layer made of $SiO_2$ thick. This makes it possible to secure a distance with a Si substrate high in thermal conductivity, and to suppress diffusion of the heat applied to the cores of the optical waveguides.

A third method is to etch a semiconductor substrate made of Si below the optical waveguides, by wet etching. This makes it possible to reduce a volume of the semiconductor substrate high in thermal conductivity, and to suppress diffusion of the heat applied to the cores of the optical waveguides.

SUMMARY OF THE INVENTION

Technical Problem

The above-described methods to embody reduction in power consumption of the Silica-based PLC optical switch each have issues and problems.

More specifically, the first method is already often used. The heat applied to the cores is diffused to the Si substrate in a vertical direction more than to the glass in a direction horizontal to the Si substrate. Even when the heat insulation grooves can moderate diffusion of the heat in the direction horizontal to a surface of the planar lightwave circuit, diffusion of the heat to the Si substrate in the vertical direction cannot be prevented. Accordingly, the obtainable effect only by the heat insulation grooves is small. To further reduce the power consumption, a method of moderating diffusion of the heat to the Si substrate in the vertical direction is effective.

In the case of the second method, to increase the thickness of the underclad layer, it is typically necessary to deposit a thermal oxidation film on a top surface of the Si substrate. When the thickness of the underclad layer is increased, a deposition time and its cost are exponentially increased in film formation principle, and difficulty of the film formation is increased. Therefore, execution of the film formation is limited. Accordingly, in terms of mass production of the optical switch at low cost, the second method is not appropriate.

In the case of the third method, the wet etching treatment is large in process error, and dimensional control is structurally difficult. In other words, a peripheral structure of the optical waveguides influences optical characteristics in the optical waveguides, in particular, near the interferometer. For example, the multicast switch in which a plurality of switches are integrated requires uniformization of characteristics of all of the integrated switches. When the Si substrate is etched by the wet etching, however, the structure is easily fluctuated in a chip surface, which may cause defects. Accordingly, in terms of manufacturing stability, the third method is not appropriate.

In other words, to meet the requests for further reduction of power consumption in the Silica-based PLC optical switch, it is necessary to adopt a structure that can suppress influence of thermal diffusion, other than the heat insulation grooves in the first method. It is desirable to provide, by the method, the Silica-based PLC optical switch that can be fabricated by high-control process at low cost while realizing low power consumption. These technical issues are present not only in the multicast switch but also in all of the Silica-based PLC optical switches.

Embodiments of the present invention are made to solve the issues in consideration of such circumstances. An object of the embodiments of the present invention is to provide an optical module including a planar optical waveguide type optical device of a structure that makes it possible to sufficiently suppress influence of thermal diffusion and to embody low power consumption, and a manufacturing method thereof.

Means for Solving the Problem

To achieve the above-described object, according to an embodiment of the present invention, an optical module includes a planar waveguide optical switch including a Mach-Zehnder interferometer driven by a thermo-optical effect, in which a planar lightwave circuit layer is provided on a top surface of a Si substrate, the planar lightwave circuit layer including optical waveguides, heaters, and electric wires, the optical waveguide including an underclad layer, a core, and an overclad layer made of $SiO_2$, the heater heating the optical waveguide, the electric wire supplying power to the heater, trench structure portions as concave grooves are provided in a local portion including an interface between the underclad layer and the top surface of the Si substrate, and the trench structure portions are provided to suppress diffusion of heat applied from the heater to the core, to the Si substrate below the core.

Further, to achieve the above-described object, according to another embodiment of the present invention, a method of manufacturing an optical module including a planar waveguide optical switch, includes: a first step of forming trench structure in a local portion including an interface between an underclad layer made of $SiO_2$ and a Si substrate, on a top surface of the Si substrate; and a second step of forming a planar lightwave circuit layer to cause the trench structure to suppress diffusion of heat applied from heaters to cores, to the Si substrate below the cores, the planar lightwave circuit layer including optical waveguides, the heaters, and electric wires, the optical waveguide including the underclad layer, the core, and an overclad layer, the heater heating the optical waveguide, the electric wire supplying power to the heater, in which, in the first step, after grooves are formed in optional patterns in a predetermined region of the Si substrate, the surface of which is previously thermally oxidized, another Si substrate is bonded onto the Si substrate provided with the grooves, by high-temperature heat treatment, and thermal oxidation treatment is performed on the bonded Si substrate.

Effects of the Invention

According to the embodiment of the present invention, the above-described configuration makes it possible to sufficiently suppress influence of thermal diffusion, and to embody low power consumption. Further, according to another embodiment, the above-described process makes it possible to sufficiently suppress influence of thermal diffusion, and to provide an inexpensive optical module that can embody low power consumption and has high quality.

DESCRIPTION OF EMBODIMENTS

Hereinafter, some embodiments about an optical module and a method of manufacturing the optical module according to the present invention are described in detail with reference to drawings.

Figure 1:
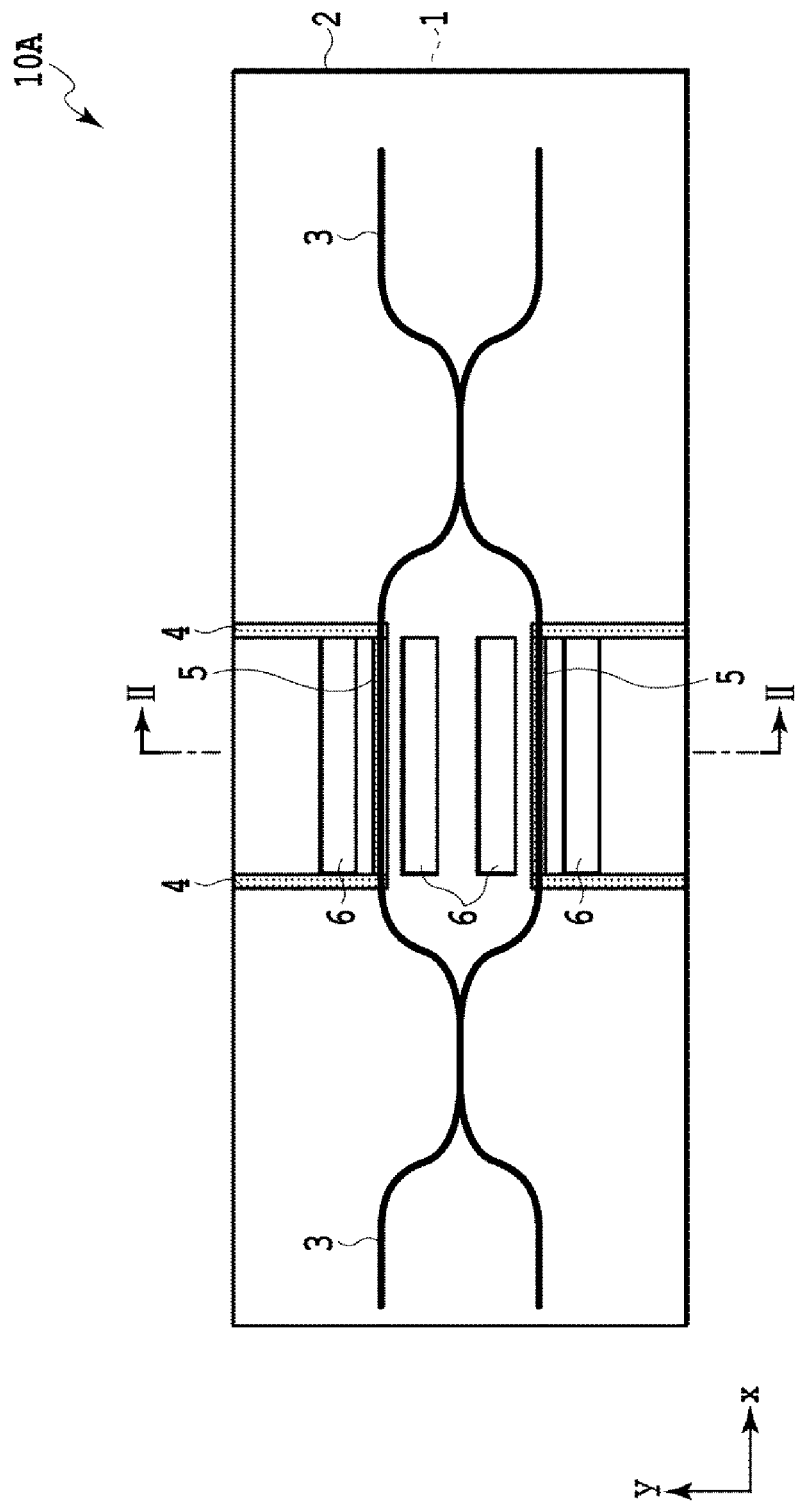
FIG. 1 is a plan view illustrating, from a top surface direction, a circuit configuration of an optical switch using a Silica-based PLC according to a prior art.
Figure 2:
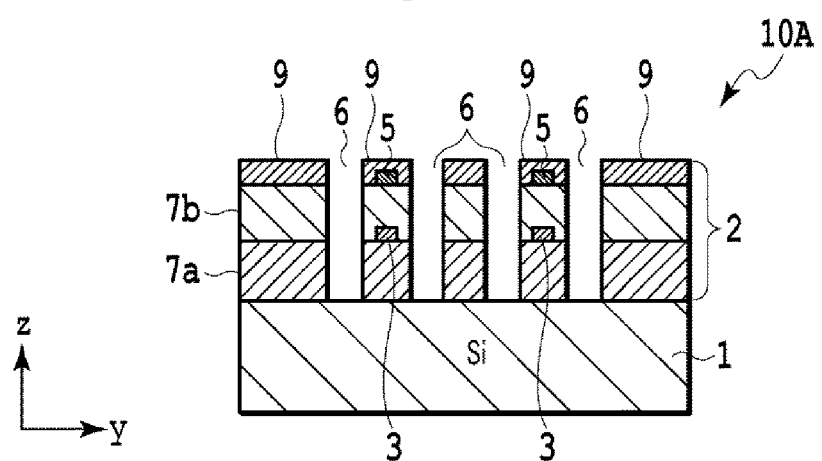
FIG. 2 is a cross-sectional view illustrating an end surface structure in a direction of a line II-II in FIG. 1.

To deepen understanding of the present invention, an optical module according to a prior art is first described. FIG. 1 is a plan view illustrating, from a top surface direction, a circuit configuration of an optical switch 10A using a Silica-based PLC according to a prior art. FIG. 2 is a cross-sectional view illustrating an end surface structure in a direction of a line II-II in FIG. 1. Note that the direction of the line II-II in FIG. 1 can be regarded as a width direction (Y-axis direction) of a Si substrate 1, and a direction perpendicular to the width direction (Y-axis direction) can be regarded as a length direction (X-axis direction) of the Si substrate 1. Further, a direction perpendicular to the width direction and the length direction of the Si substrate 1 can be regarded as a thickness direction (Z-axis direction) of the Si substrate 1.

Referring to each of the drawings, the optical switch 10A is configured by providing a planar lightwave circuit layer 2 of a Silica-based PLC using a Mach-Zehnder interferometer (MZI), on a top surface of the Si substrate 1 made of silicon Si.

In the planar lightwave circuit layer 2, an underclad (UC) layer 7a made of $SiO_2$ and an overclad (CC) layer 7b are stacked on the top surface of the Si substrate 1, and an optical waveguide core (optical path) 3 is provided in a certain pattern so as to be covered with the layers. An optical waveguide has a structure configuring a Mach-Zehnder interferometer. Further, heaters 5 are provided at positions just above the optical waveguide core 3 at arms, on a top surface of the overclad layer 7b, and power supply electric wires 4 are electrically connected to both ends of the heaters 5.

The optical switch 10A adopts the Mach-Zehnder interferometer driven by a thermo-optical effect. Further, near the optical waveguide core 3 at the arms and the heaters 5, heat insulation grooves 6 according to the above-described first method are provided. In addition, the top surface of the overclad layer 7b including the heaters 5 and the electric wires 4 is covered with a protection film 9, except for the heat insulation grooves 6. The heat insulation grooves 6 and the protection film 9 are formed as components of the planar lightwave circuit layer 2, as necessary. As the protection film 9, glass is often used.

In the optical switch 10A, paired arms each including the optical waveguide core 3 and the heater 5 are provided, and power is supplied to the heater 5 provided in at least one of the arms to heat the optical waveguide core 3. When a refractive index of the optical waveguide core 3 is changed by the heat and an interference state of light from the two arms is changed, switching operation in which the light is turned on or off is obtainable. At this time, diffusion of the heat applied to the optical waveguide core 3 is prevented to some extent by an Air layer formed by the heat insulation grooves 6.

When a plurality of switching elements of the optical switch 10A are integrated in a chip, an M×N multicast switch can be configured, where M and N are each a positive integer of 2 or more, and there is a case of M=N.

In the optical switch 10A, the optical waveguide core 3, the heaters 5, the electric wires 4, the heat insulation grooves 6, and the like are also processed by exposure development and etching. The overclad layer 7b may be formed by any of well-known techniques such as a flame hydrolysis deposition (FHD) method, a chemical vapor deposition (CVD) method, and a sputtering method. In the existing optical switch 10A, the underclad layer 7a made of $SiO_2$ is formed by an optional film formation method; however, a thermal oxidation film is often used.

Figure 5:
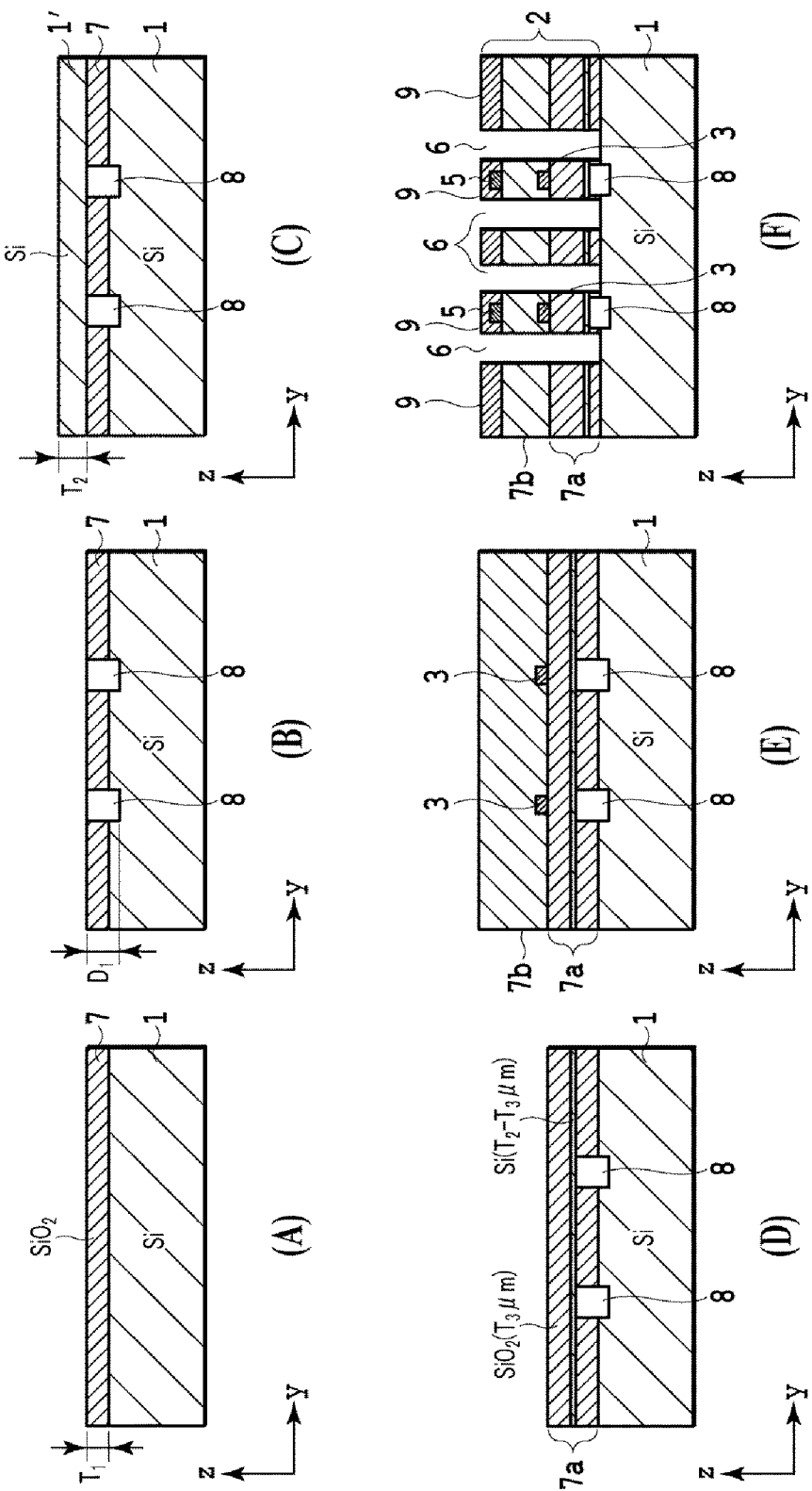
FIGS. 5(A) to 5(F) are diagrams each illustrating a cross-section of an end surface structure in each step of a process of manufacturing the Silica-based PLC optical switch illustrated in FIG. 3 and FIG. 4.

The underclad layer 7a of an optical switch 10B described below is also formed by an optional film formation method. In a case where a trench structure is fabricated in a manufacturing process described with reference to FIG. 5, a $SiO_2$ layer is formed by thermal oxidation. Further, the trench structure is provided on an interface between the underclad layer 7a on the top surface of the Si substrate 1 and the Si substrate 1. To fabricate such a trench structure, grooves are formed in an optional pattern in a predetermined region of the Si substrate 1, the surface of which is previously thermally oxidized. Thereafter, another Si substrate is bonded onto the Si substrate 1 provided with the grooves, by high-temperature heat treatment, and thermal oxidation treatment (process) is performed on the bonded Si substrate.

To drive the optical switch 10A, power is supplied to the heaters 5 of respective switches to heat the optical waveguide core 3; however, heat conduction efficiency from the heaters 5 to the optical waveguide core 3 influences power consumption in driving of the switch. In other words, referring to FIG. 2, the heat of the heaters 5 is transferred to the optical waveguide core 3 through the overclad layer 7b, but the heat transferred to the core 3 is diffused to the underclad layer 7a, the overclad layer 7b, the protection film 9 near the core 3, and the Si substrate 1 below the core 3.

When a thermal conductivity [W/(mk)] of each of materials of the respective layers is examined, the thermal conductivity of $SiO_2$ forming the clad is 1.4 at temperature [K]=273, whereas the thermal conductivity of Si forming the Si substrate 1 is 26.14 at temperature [K]=300. Further, the thermal conductivity of Air in the space of each of the heat insulation grooves 6 is 0.0241 at temperature [K]=273. As a result, Si as the material of the Si substrate 1 is particularly high in thermal conductivity, which largely influences thermal diffusion of the optical waveguide core 3.

Accordingly, to switch the on/off state of the switch, it is necessary to continuously supply power. For example, to drive all of paths of (array of) the M×N multicast switch, a considerable amount of power is consumed. Due to such circumstances, to realize low power consumption of the optical switch, it is important to prevent the heat applied to the optical waveguide core 3 from being diffused to surroundings. When heat diffusion efficiency is low, a response speed of the switch becomes low as a matter of course; however, the low response speed has no influence because a response speed of several seconds is sufficient for an application in which a switching frequency of the paths is small, such as the multicast switch.

Embodiment 1

Figure 3:
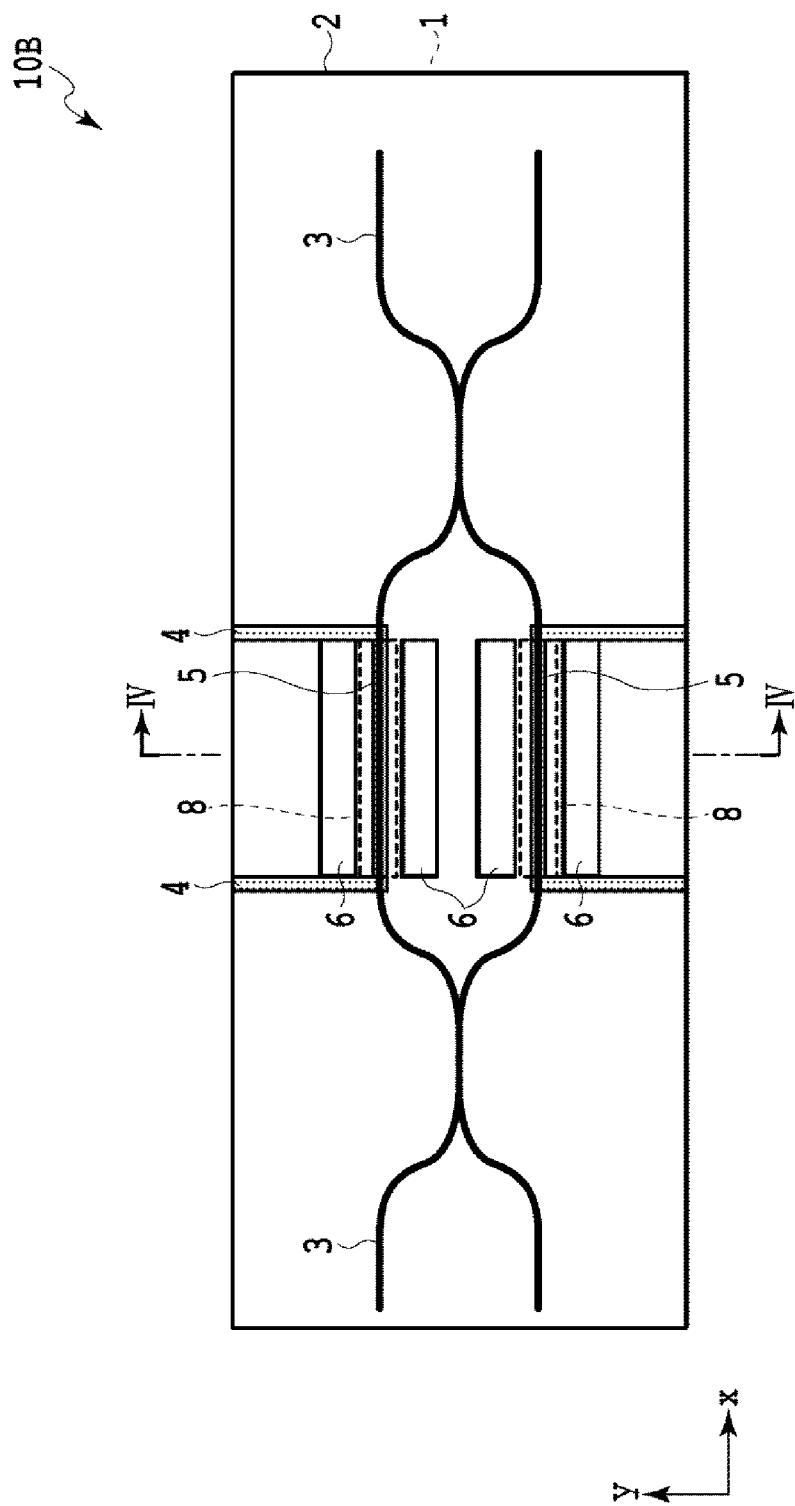
FIG. 3 is a plan view illustrating, from a top surface direction, a circuit configuration of an optical switch using a Silica-based PLC according to Embodiment 1 of the present invention.
Figure 4:
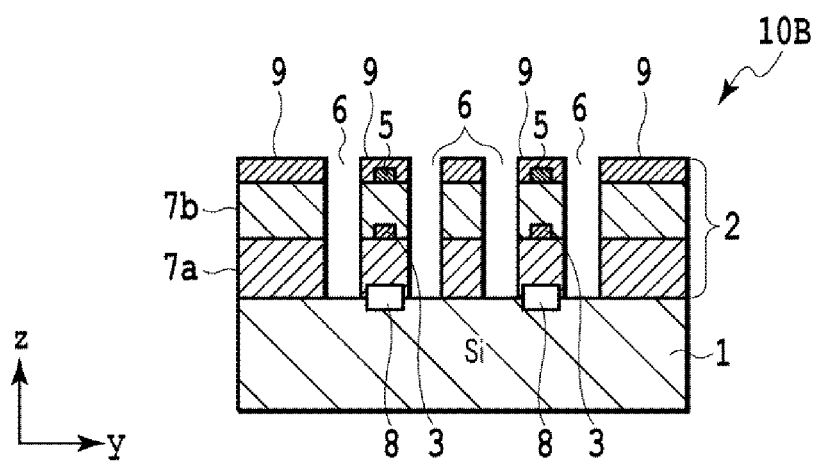
FIG. 4 is a cross-sectional view illustrating an end surface structure in a direction of a line IV-IV in FIG. 3.

FIG. 3 is a plan view illustrating, from a top surface direction, a circuit configuration of the optical switch 10B using a Silica-based PLC according to Embodiment 1 of the present invention. FIG. 4 is a cross-sectional view illustrating an end surface structure in a direction of a line IV-IV in FIG. 3. Note that, also in this case, the direction of the line IV-IV in FIG. 3 can be regarded as the width direction (Y-axis direction) of the Si substrate 1, and a direction perpendicular to the width direction (Y-axis direction) can be regarded as the length direction (X-axis direction) of the Si substrate 1. Further, a direction perpendicular to the width direction and the length direction of the Si substrate 1 can be regarded as the thickness direction (Z-axis direction) of the Si substrate 1.

Referring to each of the drawings, the optical switch 10B is configured by providing a Mach-Zehnder interferometer (MZI) of a planar lightwave circuit (PLC) using a quartz material on the top surface of the Si substrate 1.

A basic configuration of the planar lightwave circuit layer 2 is the same as in the optical switch 10A described with reference to FIG. 1 and FIG. 2. The optical switches 10A and 10B are different in that trench structure portions 8 as concave grooves are provided in a local portion including the interface between the underclad layer 7a and the top surface of the Si substrate 1. In other words, the optical switch 10B includes the trench structure 8 to suppress diffusion of the heat applied from the heaters 5 to the core 3, to the Si substrate 1 below the core 3. To form the trench structure 8, grooves are formed in an optional pattern in a predetermined region of the Si substrate 1, the surface of which is previously thermally oxidized. Thereafter, another Si substrate is bonded onto the Si substrate 1 provided with the grooves, by high-temperature heat treatment, and thermal oxidation treatment (process) is performed on the bonded Si substrate. The detail thereof is described below.

Thereafter, in a second step, the optical waveguide core 3 is provided so as to be covered with the underclad layer 7a and the overclad (CC) layer 7b. Further, the planar lightwave circuit layer 2 is provided so as to include the heaters 5 heating the optical waveguide core 3 and the electric wires 4 supplying power to the heaters 5.

Also in the optical switch 10B, power is supplied to the heater 5 provided on one of the paired arms each including the optical waveguide core 3 and the heater 5, to heat the optical waveguide core 3. When the refractive index of the optical waveguide core 3 is changed by the heat and the interference state of the light from the two arms is changed, switching operation in which the light is turned on or off is obtainable. At this time, diffusion of the heat applied to the optical waveguide core 3 is prevented by the Air layer formed by the heat insulation grooves 6 and cavities of the trench structure portions 8. In particular, as compared with the optical switch 10A, a little contact area between the underclad layer 7a and the Si substrate 1 is secured. As a result, the heat is hardly transferred to the Si substrate 1, which makes it possible to sufficiently suppress thermal diffusion.

To manufacture such an optical switch 10B, it is necessary to perform a first step and a second step described below.

The first step is a step of forming the trench structure 8 in the local portion including the interface between the underclad layer 7a and the Si substrate 1, on the top surface of the Si substrate 1. Further, in the first step, the grooves are formed in an optional pattern in a predetermined region of the Si substrate 1, the surface of which is previously thermally oxidized. Thereafter, another Si substrate is bonded onto the Si substrate 1 provided with the grooves, by high-temperature heat treatment, and thermal oxidation treatment (process) is performed on the bonded Si substrate.

The second step is a step of forming the planar lightwave circuit layer 2 that includes the optical waveguide core 3 covered with the underclad layer 7a and the overclad layer 7b, the heaters 5 heating the optical waveguide core 3, and the electric wires 4 supplying power to the heaters 5. At this time, the planar lightwave circuit layer 2 is formed such that the trench structure 8 can suppress diffusion of the heat applied from the heaters 5 to the core 3, to the Si substrate 1 below the core 3.

In the first step, the trench structure 8 can be formed by an optional method; however, as an example, a manufacturing process described below with reference to FIGS. 5(A) to 5(F) can be proposed.

FIGS. 5(A) to 5(F) are diagrams each illustrating a cross-section of an end surface structure in each step of the process of manufacturing the optical switch 10B illustrated in FIG. 3 and FIG. 4.

First, in a thermal oxidation treatment step illustrated in FIG. 5(A), a thermal oxidation film of $SiO_2$ is formed on the top surface that is one of main surfaces of the Si substrate 1, by thermal oxidation treatment, to form the clad layer 7 having a thickness of $T_1$ μm (about several μm).

Next, in a concave groove formation step illustrated in FIG. 5(B), by introducing general-purpose exposure development and etching technique, the trench structure portions 8 as concave grooves each having a depth $D_1$ μm are formed from the top surface side so as to reach the clad layer 7 and the Si substrate 1. However, in the formation of the trench structure portions 8, only the clad layer 7 may be etched ($T_1 \geq D_1$), or not only the clad layer 7 but also the Si substrate 1 may be etched ($T_1 < D_1$).

At this time, it is sufficient for the depth $D_1$ of each of the trench structure portions 8 to satisfy $0 \leq D_1$. For example, when the Si substrate 1 just below the optical waveguide core 3 formed in a subsequent step is partially removed, it is possible to effectively prevent the heat applied to the optical waveguide core 3 from being diffused to the Si substrate 1 through the underclad layer 7a. Alternatively, the above-described relationship may be $0 < D_1 < T_1$.

At this time, in consideration of a wafer before being diced into product chips, an alignment mark as a reference for positioning when each portion is formed in the subsequent steps is preferably provided. Note that the trench structure portions 8 may be arranged over the entire surface of the wafer in a certain pattern with a regular cycle, irrespective of the layout of the optical switch 10B. Further, in such a case, the trench structure portions 8 may be arranged such that a part of the pattern in the chip diced from the wafer communicates with an end surface of the chip or communicates with the other adjacent pattern. However, any of the patterns communicates with outside atmosphere. These techniques relating to the wafer are described in the other embodiment described below.

Further, in a substrate bonding step illustrated in FIG. 5(C), another Si substrate 1' made of Si and having a thickness of $T_2$ μm is bonded to the top surface side of the Si substrate 1 provided with the clad layer 7 and the trench structure portions 8, by high-temperature heat treatment or the like. The thickness $T_2$ is about several μm.

Subsequently, in a thermal oxidation treatment step illustrated in FIG. 5(D), a thermal oxidation film having a thickness of $T_3$ μm is formed by thermal oxidation treatment, with the other Si substrate 1' bonded in the substrate bonding step as a reference. At this time, it is sufficient for the thicknesses to satisfy relationship of $T_2 \geq T_3$. Therefore, a Si layer having a thickness of $(T_2-T_3)$ μm that is a thickness when $T_2-T_3>0$ is satisfied, may be left on the local portion including a contact interface between the Si substrate 1' and the clad layer 7.

In recent years, there is an exposure apparatus having a function of performing alignment by causing an infrared ray to pass through the Si substrate 1, and having a function of exposing a bottom surface (rear surface) that is the other main surface opposite to the top surface. Therefore, it is sufficient for the thicknesses to satisfy the above-described relationship of $T_2 \geq T_3$. Note that, irrespective of presence or absence of the Si layer having the thickness of $(T_2-T_3)$ μm in the local portion including the contact interface, the clad layer 7 and the thermal oxidation film of the other Si substrate 1' subjected to the thermal oxidation treatment are regarded as the underclad layer 7a even in a case where the Si layer is present. However, an effect of preventing thermal diffusion is large when the Si layer remaining on the underclad layer 7a is small.

The thermal oxidation treatment step, the concave groove formation step, the substrate bonding step, and the thermal oxidation treatment step described above correspond to the first step briefly described above.

Thereafter, in an initial step of a circuit formation step illustrated in FIG. 5(E), the optical waveguide core 3 is formed in a certain pattern on the top surface of the underclad layer 7a, and then the overclad layer 7b made of SiO$_2$ is formed so as to cover the pattern of the optical waveguide core 3.

Finally, in a latter step of the circuit formation step illustrated in FIG. 5(F), the heaters 5 and the electric wires 4 are provided on the top surface of the overclad layer 7b.

The initial step of the circuit formation step and the latter step of the circuit formation step described above correspond to the second step briefly described above. Note that, as described above, the planar lightwave circuit layer 2 including the optical waveguide, the heaters 5, and the electric wires 4 is formed such that the trench structure 8 can suppress diffusion of the heat applied from the heaters 5 to the core 3, to the Si substrate 1 below the core 3.

Figure 6:
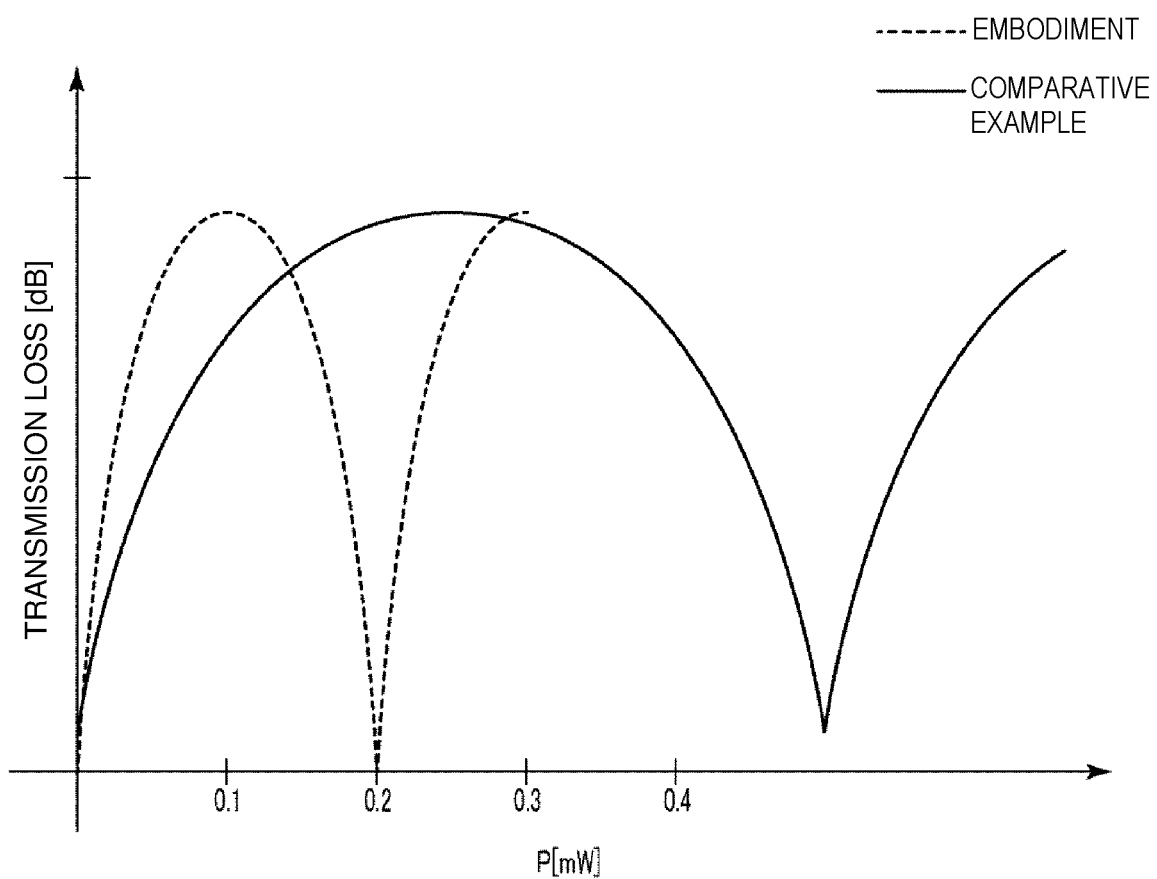
FIG. 6 is a diagram illustrating switch operation characteristics of the Silica-based PLC optical switch according to Embodiment 1 in a form of relationship of transmission loss to supply power, together with switch operation characteristics of the Silica-based PLC optical switch according to the prior art.

FIG. 6 is a diagram illustrating switch operation characteristics of the optical switch 10B according to Embodiment 1 in a form of relationship of transmission loss [dB] to supply power P [mW], together with switch operation characteristics of the optical switch 10A according to the prior art. Note that, in FIG. 6, the switch operation characteristics of the optical switch 10B are illustrated by a dashed line, and the switch operation characteristics of the optical switch 10A are illustrated by a solid line. Note that, the supply power P is supplied to the heaters 5, and the transmission loss is regarded as output light power corresponding to change of the supply power P. A configurational difference between the optical switches 10A and 10B is only presence or absence of the trench structure portions 8.

Referring to FIG. 6, in a case of P=0 mW, any of the optical switches 10A and 10B is turned off that represents the minimum transmission loss. When the supply power P is increased and becomes P=0.25 mW, the optical switch 10A is turned on that represents the maximum transmission loss as illustrated by the solid line. In contrast, when the supply power P is increased and becomes P=0.10 mW, the optical switch 10B is turned on as illustrated by the dashed line. This means that the optical switch 10B can be turned on by the small supply power P as compared with the optical switch 10A. Further, it can be confirmed that the transmission loss is equivalent between the optical switches 10A and 10B, and the trench structure portions 8 do not influence the transmission loss.

Embodiment 2

In Embodiment 2, a modified pattern example of the trench structure portions 8 and the heat insulation grooves 6 that is important to embody the low power consumption in a state where influence of the thermal diffusion in the optical switch 10B according to Embodiment 1 is suppressed, is described. As described above in the optical switch 10B in Embodiment 1, the modified pattern example corresponds to the configuration in which the number, the shapes, the dimensions, and the arrangement are set such that the trench structure portions 8 and the heat insulation grooves 6 can suppress diffusion of the heat applied to the optical waveguide core 3. In other words, the trench structure portions 8 and the heat insulation grooves 6 can be provided in optional patterns.

Figure 7:
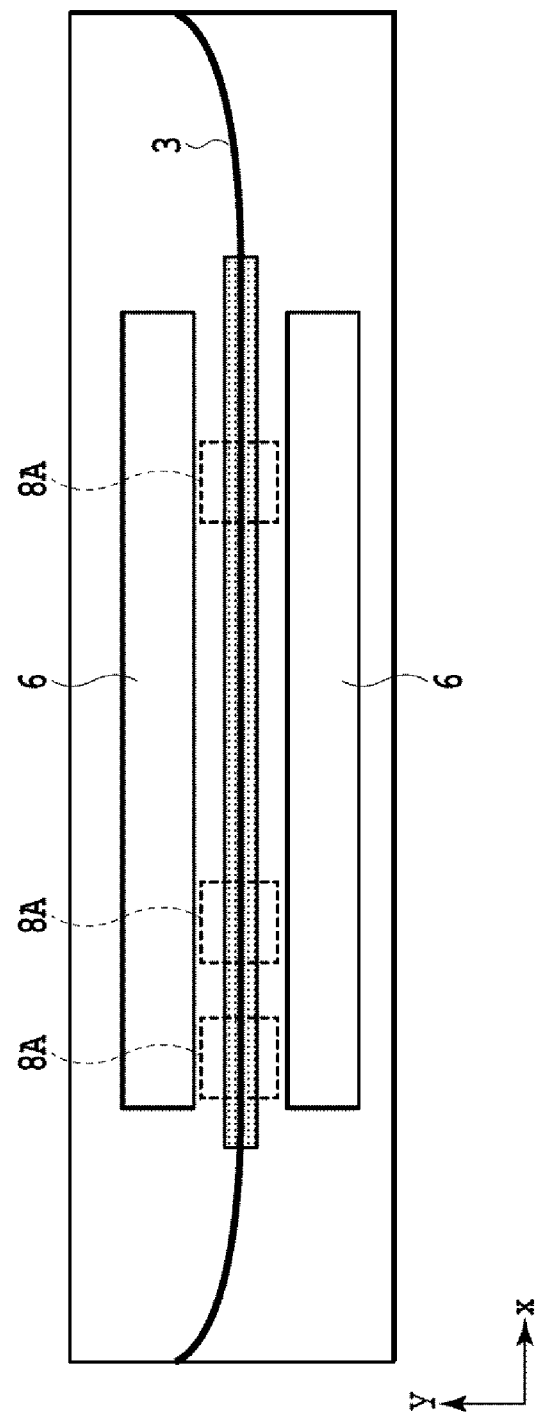
FIG. 7 is a plan view illustrating, from a top surface direction, a local portion of an aspect according to Embodiment 2 in which a main part of the circuit configuration of the Silica-based PLC optical switch according to Embodiment 1 is modified, in an enlarged manner.

FIG. 7 is a plan view illustrating, from a top surface direction, a local portion of an aspect according to Embodiment 2 in which the main part of the circuit configuration of the optical switch 10B according to Embodiment 1 is modified, in an enlarged manner.

Referring to FIG. 7, in the aspect according to Embodiment 2, in place of one trench structure portion 8 provided just below the pattern of the optical waveguide core 3 as in the case of the optical switch 10B, three trench structure portions 8A are separately provided. As an example, a case where the trench structure portions 8A are provided at two positions close to a light incident side and at one position close to a light emission side is illustrated. Further, the heat insulation grooves 6 are not changed, and are provided so as to sandwich the trench structure portions 8A in a planar projection view, in the arms and surroundings of the trench structure portions 8A.

Figure 8:
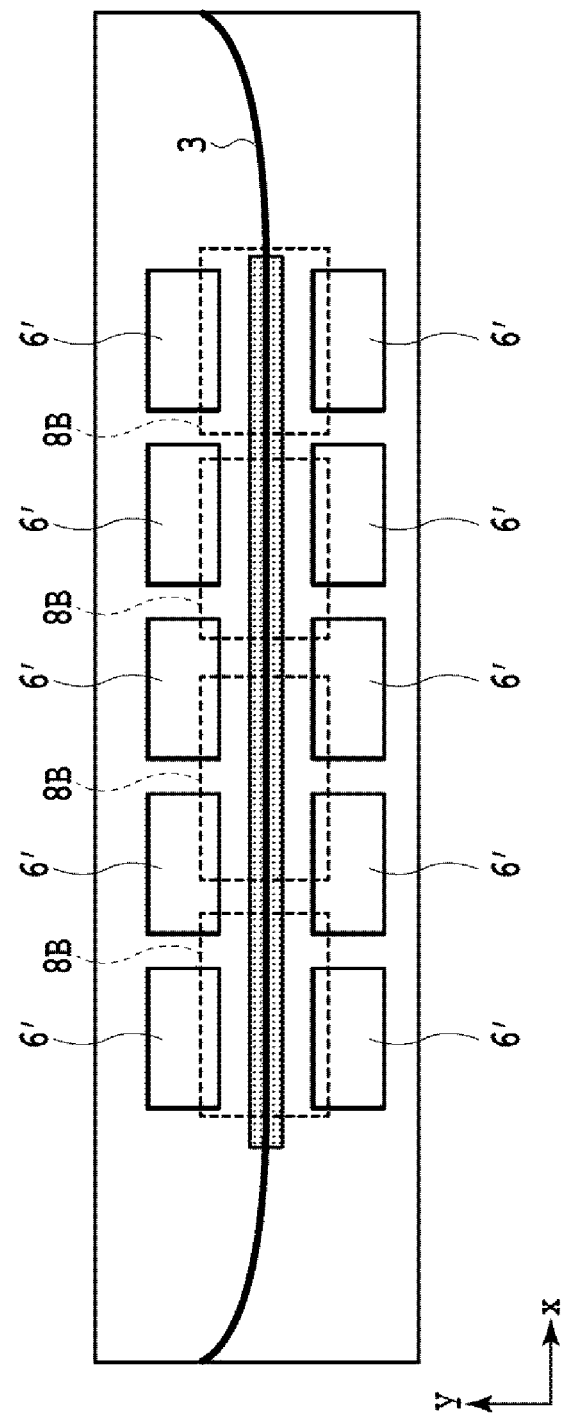
FIG. 8 is a plan view illustrating, from a top surface direction, a local portion of another aspect according to Embodiment 2 in which the main part of the circuit configuration of the Silica-based PLC optical switch according to Embodiment 1 is modified, in an enlarged manner.

FIG. 8 is a plan view illustrating, form a top surface direction, a local portion of another aspect according to Embodiment 2 in which the main part of the circuit configuration of the optical switch 10B according to Embodiment 1 is modified, in an enlarged manner.

Referring to FIG. 8, in another aspect according to Embodiment 2, in place of one trench structure portion 8 provided just below the pattern of the optical waveguide core 3 as in the case of the optical switch 10B, four trench structure portions 8B are separately provided. As an example, a case where the trench structure portions 8B are arrayed at equal intervals from the light incident side toward the light emission side is illustrated. Further, five heat insulation grooves 6' are separately provided on each of sides of the array of the trench structure portions 8B such that the heat insulation grooves 6' sandwich the array of the trench structure portions 8B in a planar projection view, in the arms and the surroundings of the trench structure portions 8B. Further, in this example, a case where the pattern of the trench structure portions 8B and the pattern of the heat insulation grooves 6' may be overlapped is illustrated.

In Embodiment 2, as described with reference to FIG. 7 and FIG. 8, the shapes, the dimensions, the number of divisions, and the arrangement of the trench structure portions 8 and the heat insulation grooves 6 in the optical switch 10B are optionally settable in consideration of a function of suppressing thermal diffusion. Further, a combination of the patterns of the trench structure portions 8 and the heat insulation grooves 6 is also optionally settable in consideration of the function of suppressing thermal diffusion.

Embodiment 3

In Embodiment 3, a case where the arrangement pattern of the trench structure portions 8 of the optical switch 10B according to Embodiment 1 is applied to a wafer before being diced into product chips in order to reduce the manufacturing cost is described.

Figure 9:
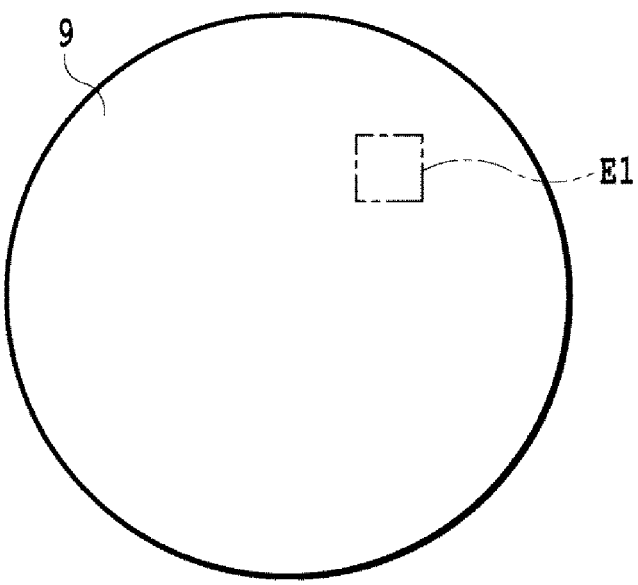
FIG. 9 is a plan view illustrating, from a top surface direction, an aspect of a wafer according to Embodiment 3 before being diced into product chips applicable to the circuit configuration of the Silica-based PLC optical switch according to Embodiment 1.
Figure 10:
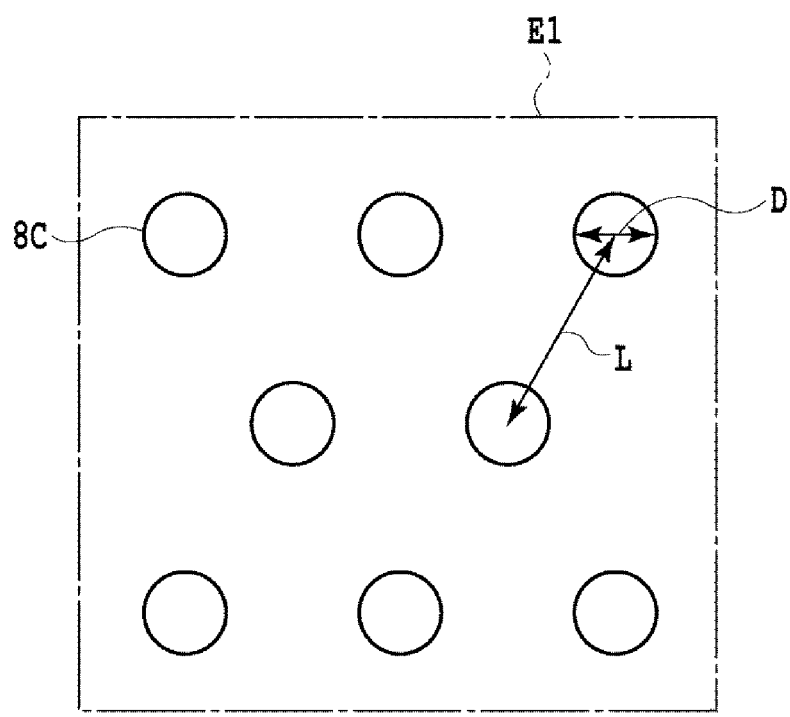
FIG. 10 is a plan view illustrating a state where trench structure portions are arranged in a certain pattern, by enlarging a region E1 of the wafer of FIG. 9.

FIG. 9 is a plan view illustrating, from a top surface direction, an aspect of a wafer 9 according to Embodiment 3 before being diced into product chips applicable to the circuit configuration of the optical switch 10B according to Embodiment 1. FIG. 10 is a plan view illustrating a state where the trench structure portions 8C are arranged in a certain pattern, by enlarging a region E1 of the wafer 9.

In this example, for example, attention is paid to impartment of flexibility to use applications of the Si substrate 1 in which the underclad layer 7a of the thermal oxidation film having the trench structure portions 8 obtained by the thermal oxidation treatment step illustrated in FIG. 5(D) in the process of manufacturing the optical switch 10B. To this end, the trench structure portions 8C are arranged over the entire surface of the wafer 9 in a certain pattern with a regular cycle as in the region E1 in FIG. 10.

In Embodiments 1 and 2, it is necessary to prepare the wafer in which the trench structure portions 8 are arranged corresponding to the arrangement position of the MZI of each optical switch 10B. Therefore, it is necessary to prepare the wafers having the trench structure portions 8 arranged in patterns corresponding to the respective pattern layouts of the optical waveguide, namely, the wafers subjected to the first step. In recent years, an application range of the CDC-ROADM is expanded, and various types of multicast switch such as an 8×8 multicast switch, an 8×16 multicast switch, and a 16×13 multicast switch are used. The trench structure portions may be arranged in patterns corresponding to the patterns of the various kinds of switches. In this case, however, the use application of the wafer 9 is not flexible, and it is difficult to manage the inventory. In addition, it takes a long time for the thermal oxidation treatment, and it is accordingly difficult to immediately fabricate the trench structure portions in a pattern of a necessary type, as necessary.

In contrast, the pattern of the trench structure portions 8C illustrated in FIG. 10 is usable for any type of the multicast switch. In the pattern of the trench structure portions 8C, holes each having a diameter of D μm are arranged in a triangular lattice shape having a distance cycle of L μm. The layout, however, is merely an example, and the shapes, the sizes, the arrangement cycle, and the like of the used trench structure portions are optionally settable. In other words, the pattern of the trench structure portions 8C of the wafer 9 is also applicable to the pattern of the trench structure portions 8 of the optical switch 10B according to Embodiment 2.

As described above, the wafer 9 is usable for any type of the optical switch, which facilitates inventory management of the wafer 9. When the pattern of the trench structure portions is not custom-designed, it is possible to reduce the fabrication cost of the wafer 9. As a result, for example, it is possible to reduce a price of a chip of the optical switch 10B including the trench structure portions 8 after being diced into product chips.

Embodiment 4

In Embodiment 4, a chip obtained in such a manner that the arrangement pattern of the trench structure portions 8 of the optical switch 10B according to Embodiment 1 for reduction of the manufacturing cost is modified, the modified arrangement pattern is applied to a wafer, and the wafer is diced into product chips, is described.

Figure 11:
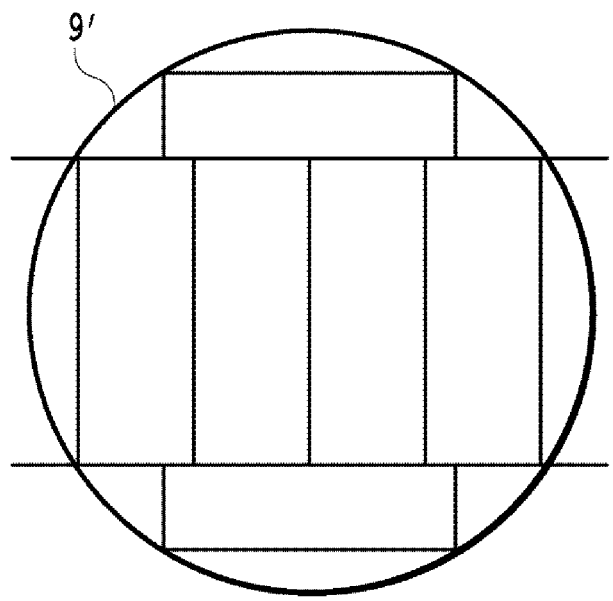
FIG. 11 is a plan view illustrating, from a top surface direction, another aspect of a wafer according to Embodiment 4 adopting the circuit configuration of the Silica-based PLC optical switch according to Embodiment 1.
Figure 12:
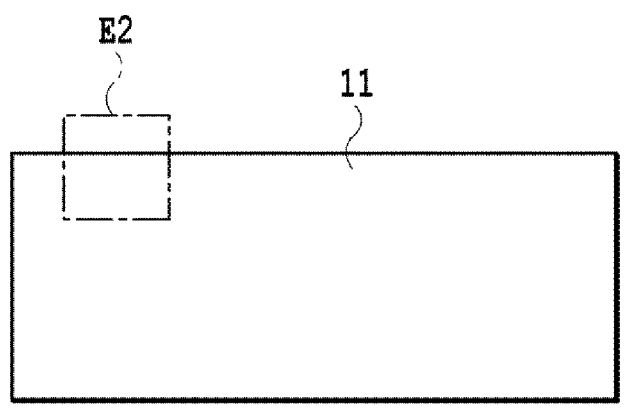
FIG. 12 is a plan view illustrating, from a top surface direction, a chip after the wafer of FIG. 11 is diced into product chips.

FIG. 11 is a plan view illustrating, from a top surface direction, another aspect of a wafer 9' according to Embodiment 4 adopting the circuit configuration of the optical switch 10B according to Embodiment 1. FIG. 12 is a plan view illustrating, from a top surface direction, a chip 11 after the wafer 9' is diced into product chips.

In this example, for example, a structure enhancing reliability of the trench structure portions 8 is adopted. The trench structure portions 8 may be normally filled with a gas such as air and nitrogen, or may be in a vacuum state. However, if the optical switch 10B is used under high-temperature environment or the like, when the trench structure portions 8 are filled with gas, a load may be applied to the trench structure portions 8 due to thermal expansion, which may cause breakage. Accordingly, measures to stabilize the trench structure portions 8 irrespective of the use environment of the optical switch 10B are taken.

Figure 13:
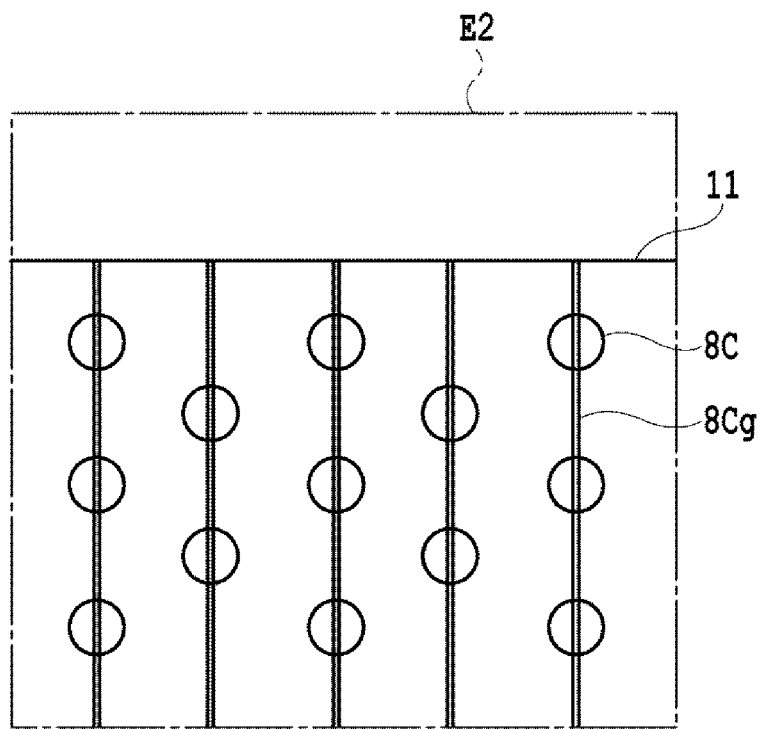
FIG. 13 is a plan view illustrating a state where trench structure portions are arranged in a pattern including extension portions in thermal oxidation treatment step, by enlarging a region E2 in FIG. 12.
Figure 14:
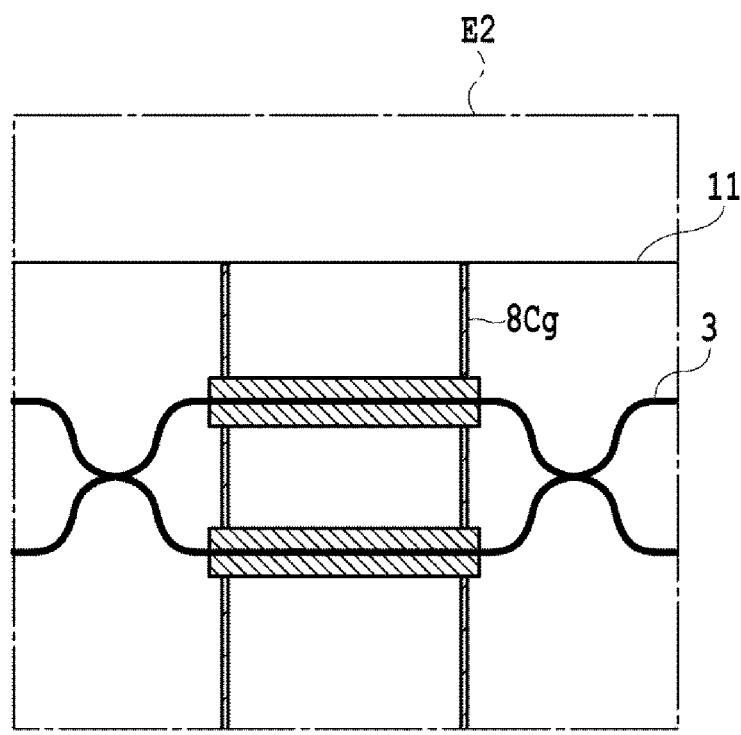
FIG. 14 is a plan view illustrating a state where the trench structure portions are arranged in the pattern including the extension portions in a middle of a circuit formation step, by enlarging the region E2 in FIG. 12.

FIG. 13 is a plan view illustrating a state where the trench structure portions 8C are arranged in a pattern including extension portions 8Cg in the thermal oxidation treatment step, by enlarging a region E2 in FIG. 12. Further, FIG. 14 is a plan view illustrating a state where the trench structure portions 8 are arranged in a pattern including the extension portions 8Cg in a middle of the circuit formation step, by enlarging the region E2 in FIG. 12. Note that FIG. 13 corresponds to the thermal oxidation treatment step illustrated in FIG. 5(D) in the process of manufacturing the optical switch 10B, and FIG. 14 corresponds to the latter step of the circuit formation step illustrated in FIG. 5(F) in the process of manufacturing the optical switch 10B.

FIG. 13 and FIG. 14 each illustrate a state where the trench structure portions 8 or 8C are formed such that, when the wafer is diced into chips, the extension portions 8Cg as parts of the pattern are connected to outside. The trench structure portions 8 and 8C having the extension portions 8Cg connected to the outside can eliminate influence by confinement of gas inside the trench structure portions 8 and 8C. The chip 9 described in Embodiment 3 has the configuration in which the trench structure portions 8 do not have the extension portions 8Cg of the pattern, and the chip 9' described in Embodiment 4 has the configuration in which the trench structure portions 8 and 8C have the extension portions 8Cg of the pattern.

In other words, as illustrated in FIG. 13, in the case where the pattern of the trench structure portions 8C arranged with the regular cycle over the entire surface of the wafer 9' includes the extension portions 8Cg, the extension portions 8Cg serve as vent holes communicating with the end part of the chip 11. This makes it possible to prevent gas from being confined in the whole of the trench structure portions 8C. Further, as illustrated in FIG. 14, in the case where the trench structure portions 8 are formed near the Mach-Zehnder interferometer of the optical switch 10B, when the pattern of the trench structure portions 8 similarly includes the extension portions 8Cg, the extension portions 8Cg also serve as vent holes communicating with the end part of the chip 11. This makes it possible to prevent gas from being confined in the trench structure portions 8.

As described above, the optical switch 10B according to Embodiment 1 can sufficiently suppress influence of thermal diffusion and can embody the low power consumption also in the cases described in the other embodiments. Note that, in the other embodiments, it is described that the trench structure portion 8 may be arranged in the pattern corresponding to the layout of the optical waveguide, or may be arranged in an optional pattern not corresponding to the layout of the optical waveguide, for example, as a periodic structure. In other words, the pattern of the trench structure portions 8 may have an optional shape, an optional dimension, and an optional arrangement period. As a result, an inexpensive optical module having the above-described performance and high quality is obtainable.

More specifically, as described as the switch operation characteristics with reference to FIG. 6, the optical switch 10B can be reduced in power consumption. This makes it possible to realize low power consumption and price reduction of the CDC-ROADM system including the optical switch 10B and the optical communication network.

Further, in the optical switch 10B, the thickness of the thermal oxidation film formed on the top surface of the underclad layer 7a is reduced in formation of the trench structure portions, in consideration of the cost that is increased along with increase in thickness of the thermal oxidation film. As a result, it is possible to largely reduce the cost of the entire Si substrate 1 including the cost of the process of forming the trench structure portions.

Furthermore, since general-purpose dry etching is applicable to the main part of the process of manufacturing the optical switch 10B, stability in the manufacturing process is high, and optical characteristics that are easily varied due to minute structure change are maintained at high reliability.

REFERENCE SIGNS LIST 1, 1' Si substrate
2 Planar lightwave circuit layer
3 Core
4 Electric wire
5 Heater
6, 6' Heat insulation groove
7 Clad layer
7a Overclad layer
7b Underclad layer
8, 8A, 8B, 8C Trench structure portion
8Cg Extension portion
9, 9' Wafer
10A, 10B Optical switch
D Diameter
$D_1$ Depth
L Distance cycle
$T_1$, $T_2$, $T_3$ Thickness

The invention claimed is:

1. An optical module comprising a planar optical waveguide type optical switch that includes a Mach-Zehnder interferometer driven by a thermo-optical effect, wherein
a planar lightwave circuit layer is provided on a top surface of a Si substrate, the planar lightwave circuit layer including optical waveguides, heaters, and electric wires, each of the optical waveguides including an underclad layer, a core, and an overclad layer made of $SiO_2$, the heaters heating the optical waveguides, the electric wires supplying power to the heaters,
trench structure portions as concave grooves are formed in a region between the core and the Si substrate in a stacking direction of the Si substrate, the underclad layer, the core, and the overclad layer, including an interface between the underclad layer and a top surface of the Si substrate, and
the trench structure portions are provided to suppress diffusion of heat applied from the heaters to the cores, to the Si substrate below the cores.

2. The optical module according to claim 1, wherein the trench structure portions are formed in a bonded state by bonding the Si substrate in which the grooves are provided in a predetermined region and another Si substrate for thermal oxidation treatment, and a thin film of a Si layer made of thermal oxidation film remains on a bonded interface.

3. The optical module according to claim 1, wherein a pattern of the trench structure portions is formed in a portion of an area of the Si substrate that includes an area directly below the cores and the heaters.

4. The optical module according to claim 1, wherein a pattern of the trench structure portions is formed in regular cycles on the entire top surface of the Si substrate.

5. A method of manufacturing an optical module including a planar optical waveguide type optical switch, the method comprising:
forming a trench structure in a local portion including an interface between an underclad layer made of $SiO_2$ and an Si substrate, on a top surface of the Si substrate; and
forming a planar lightwave circuit layer to cause the trench structure to suppress diffusion of heat applied from heaters to cores, to the Si substrate below the cores, the planar lightwave circuit layer including optical waveguides, the heaters, and electric wires, each of the optical waveguides including the underclad layer, a core, and an overclad layer, a heater heating the optical waveguide, and an electric wire supplying power to the heater, wherein
in the forming of the trench structure, after grooves are formed in a predetermined region of the Si substrate, the top surface of which is previously thermally oxidized, another Si substrate is bonded onto the Si substrate provided with the grooves, by high-temperature heat treatment, and thermal oxidation treatment is performed on the bonded Si substrate,
the trench structure as concave grooves is formed in a region between the core and the Si substrate in a stacking direction of the Si substrate, the underclad layer, the core, and the overclad layer, including the interface between the underclad layer and the top surface of the Si substrate.

6. The method of manufacturing the optical module according to claim 5, wherein a pattern of the trench structure, in a wafer state before the Si substrate is diced into a chip, is arranged to cause a part of the pattern in the chip diced from the wafer to extend to an end surface of the chip or extend to another pattern adjacent to the pattern, and any of the patterns extend to outside atmosphere.

* * * * *